(12) United States Patent
Sanders

(10) Patent No.: US 7,382,945 B1
(45) Date of Patent: Jun. 3, 2008

(54) RADIOLOGICAL SENSOR SYSTEMS AND METHODS

(75) Inventor: Glen A. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/733,664

(22) Filed: Apr. 10, 2007

(51) Int. Cl.
*G02B 6/00* (2006.01)

(52) U.S. Cl. .............................. 385/12; 385/15; 385/39

(58) Field of Classification Search .................. 385/12, 385/15, 39
See application file for complete search history.

(56) References Cited

U.S. PATENT DOCUMENTS

2007/0109549 A1* 5/2007 Sanders et al. ............. 356/469

\* cited by examiner

*Primary Examiner*—Jennifer Doan
(74) *Attorney, Agent, or Firm*—Black Lowe & Graham pllc

(57) ABSTRACT

Systems and methods for measuring a target radiation substance using a fiber-optic sensor. An ample method includes activating the sensor at a first power level, measuring light at a photo sensor, increasing power to a second power level, if the measured light indicates possible presence of the target radiation substance, measuring light at the photo sensor after the increase in power, and outputting an error signal, if the target radiation type was not detected based on the measured light signatures. The first power level is typically between 1-1000 μWatts and the second power level is typically between 100-10000 μWatts. In a further confirmation, the power is decreased to approximately the first power level, if the error signal is not outputted.

16 Claims, 4 Drawing Sheets

RADIOLOGICAL SENSOR SYSTEMS AND METHODS

BACKGROUND OF THE INVENTION

In recent times, greater emphasis has been placed on national security and detecting threats to populations. In particular, detecting or sensing the presence of undesired chemicals or biological material in the environment has become a priority, and a variety of detection devices have been developed in response thereto.

In radiological sensors, if the sensor indicates the presence of a radiological substance, there have to be reliable methods of making sure the indication is correct. Otherwise, high false alarm rates will lead to the sensors being disabled or ignored by the user. One possibility is to use a fiber optic sensor, where the fiber darkens, or becomes lossy to light propagation when exposed to radiation. Situations that could lead to false alarms (indicative of radiation when there is none) could occur where a sensed loss is caused by fiber breakage, light source failures, or other failures, and thus causing false positive results.

Therefore, there exists a need for a radiological sensor with improved analysis capabilities and therefore a low false alarm rate.

SUMMARY OF THE INVENTION

The present invention provides systems and methods for measuring a target radiation types using a fiber-optic sensor. An example method includes activating the sensor at a first optical power level, measuring a light signal at a photo sensor and comparing it with an optical signal reference obtained in a controlled environment in the absence of radiation. If the measured optical signal is degraded based on the comparison, indicating the possible presence of the target radiation type, the optical power is increased to a second optical power level. The optical signal is then measured at the second optical power level. If the optical signal improves, as seen at the photo sensor after the increase in power, an electrical signal indicative of the presence of radiation is output. If, however, optical signal does not improve with increased power, an error signal is outputted, indicative of a sensor failure instead of presence of the target radiation type.

In one aspect of the invention, the first power level is between 1-1000 μWatts and the second power level is between 100-10000 μWatts.

In one aspect of the invention, the error signal is not outputted, if loss of the measured optical signal at the second power level is less than loss of the measured light at the first power level.

In still another aspect of the invention, the power is decreased to approximately the first power level after obtaining optical signal information at the second power level, if the error signal is not outputted. Presence of the target radiation type is confirmed if the round-trip loss of a fiber optic resonator measured after the decrease in power is less than the round-trip loss measured at the initial first power level. An error signal is generated and communicated if the round-trip loss of the resonator is not reduced via the above increased optical power cycling.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
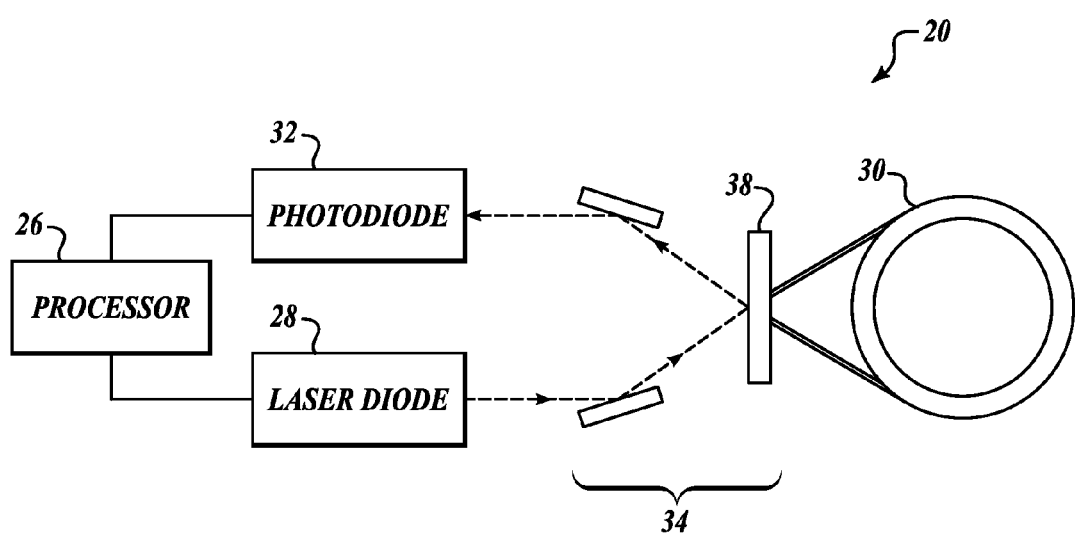
FIG. 1 illustrates a schematic diagram of an example system formed in accordance with an embodiment of the present invention.

FIG. 1 illustrates an example radiological sensor system 20 formed in accordance with an embodiment of the present invention. The system 20 includes a processor 26 that is in signal/data communication with a laser diode (light source) 28 and a photo diode 32. The laser diode and photo diode are in light communication with a fiber-optic coil, such that light generated by the laser diode 28 is transmitted through the fiber-optic coil 30 and is received by the photo diode 32 via optical components 34.

A high reflectivity mirror is placed in proximity to the fiber coil to recirculate light, forming an optical resonator when combined with the coil, such that most of the light energy exiting the coil at one end is reflected back into the coil at the other end. The wavelength of the laser diode 28 is swept such that a resonance lineshape, indicative of the roundtrip loss of the optical resonator is observed, i.e. is the "light signal" on the photo diode 32. FIG. 1 illustrates a ring resonator configuration; however, a linear resonator may also be used. The roundtrip loss of the resonator refers to the amount of reduction in the intensity of light for one roundtrip within the resonator: that is, say, from the point where light entered the first end of the coil, propagates through the fiber coil, exits the second end, is reflected in the mirror toward the first end, and enters the first end—thus completing one trip around the closed resonator loop.

The processor 26 instructs the laser diode 28 to output light at a certain wavelength and power level. The photo diode 32 senses a light signal that is outputted by the optical resonator including a highly reflective mirror 38 and the fiber-optic coil 30, and sends a sensed light signal to the processor 26. The processor 26 determines if a radiological substance has been sensed based on a measured loss contained within the received light signal.

The fiber-optic coil 30 is designed for radiological sensing of particular type of radiation. The fiber-optic coil 30 includes a glass core surrounded by a cladding material. The cladding material is impermeable to substances other than radiation. The glass core is doped in order to indicate loss (i.e., darken) when a particular type of radiation is experienced. For example, the dopant is phosphorus for the fiber in the coil to sense gamma rays.

Figure 2A:
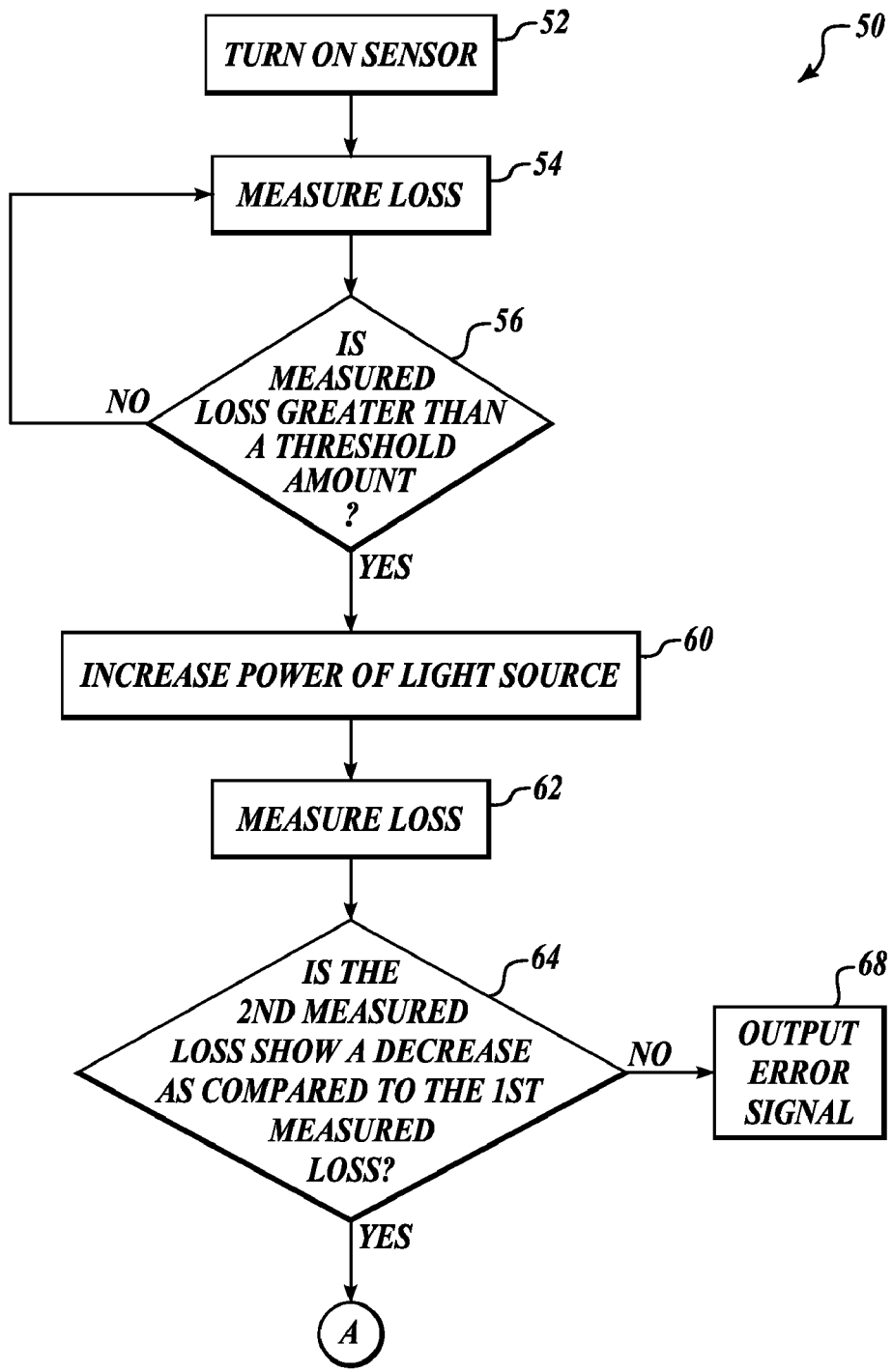
FIGS. 2A and B are a flowchart of an example process performed by the system shown in FIG. 1.
Figure 2B:
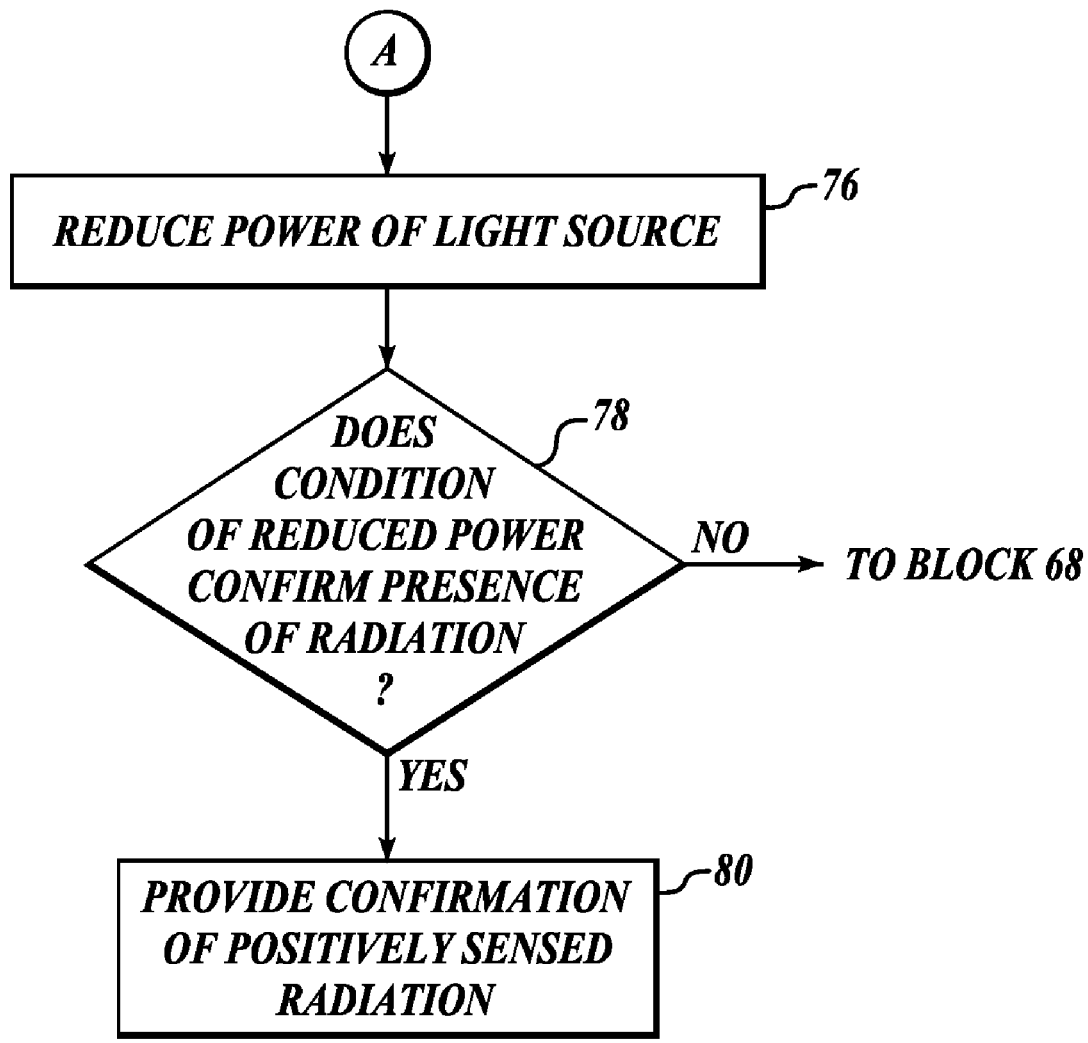

FIGS. 2A and B illustrate an example process 50 performed by the system 20 of FIG. 1. First at a block 52, the system 20 is turned on. The laser diode 28 generates light that propagates through many passes of the fiber-optic coil 30 and is then sensed by the photo diode 32 that supplies a return signal to the processor 26. The light is sensed over a period of time in which the laser diode frequency is swept. The processor 26 then determines the loss of the optical resonator, block 54 via observation of a finesse of a resonance lineshape. The finesse is a measure of the sharpness of the resonance lineshape, and is highly sensitive to the round-trip resonator loss. Higher loss broadens the resonance lineshape, and lowers its finesse. Lower loss narrows the resonance lineshape (with respect to input light frequency) and increases the finesse. The resonator loss, or finesse, is measured over a first time period (e.g., time needed to sweep the laser frequency over two free spectral ranges and observe resonance lineshapes) at a first power level (e.g., 1-1000 µWatts) of the laser diode 28. If the measured resonator loss is not greater than a predefined threshold amount, see decision block 56, then the process 50 returns to measuring the loss at block 54. However, if at the decision block 56 the loss measured (finesse of the resonator) is greater than a first predefined threshold amount, the processor 26 commands the laser diode 28 to increase power to a second level (e.g., 100-10000 µWatts) that is greater than the first level, see block 60. For example, the resonator loss may give a finesse of >300 when it is calibrated at the factory (i.e., prior to delivery). That is, in the event that the resonator finesse is below 300, the loss is determined to be above the threshold, and a "yes" answer is generated in block 56, causing the light power to be increased. Next at a block 62, the processor 26 again measures the finesse/loss of the resonator via the signal received from the photo diode 32 after a period of time (e.g. 10 sec-10 min) has expired. At a decision block 64, the processor 26 determines if the second measured loss (block 62) of the resonator is a decreased amount of loss as compared to the first measured loss (block 54). The decision at block 64 may also determine if the second measured loss shows a reduced rate of increase of loss as compared to the rate of loss at block 54. If the second measured loss does not show a decrease as compared to the first measured loss or the rate of increase of loss is not reduced, then the processor 26 outputs an error signal, block 68. This indicates that a radiological substance was not detected and the result is a false positive that might be due to some other failure, such as fiber-optic coil or light source failure. This indicates that there is a malfunction of the sensor. However, if at the decision block 64 the second measured loss does show a decrease as compared to the first measured loss of the resonator or shows a reduction in the rate of increase of loss of the resonator, then the process 50 continues to block 76. If the result of decision block 64 is positive, then the phenomenon of annealing or photobleaching is occurring.

At block 76 the processor 26 instructs the laser diode 28 to reduce power of the light outputted by the laser diode 28—similar to the first power level. Then, at decision block 78, the processor 26 determines if this new condition of reduced power confirms the presence of the target radiation (e.g. gamma rays, beta particles, etc.). If at the decision block 78 the reduced power condition fails to confirm presence of the target radiation, the process 50 returns to block 68. However, if at the decision block 78 the reduced power condition does confirm the presence of the target radiation, at block 80, the processor 26 confirms the sensed radiation (blocks 56, 64).

In one embodiment, the first measured loss (block 54) may be outputted as the sensed value when a positive result is determined at decision block 64. The double check performed at blocks 76-80 need not be performed.

Figure 3:
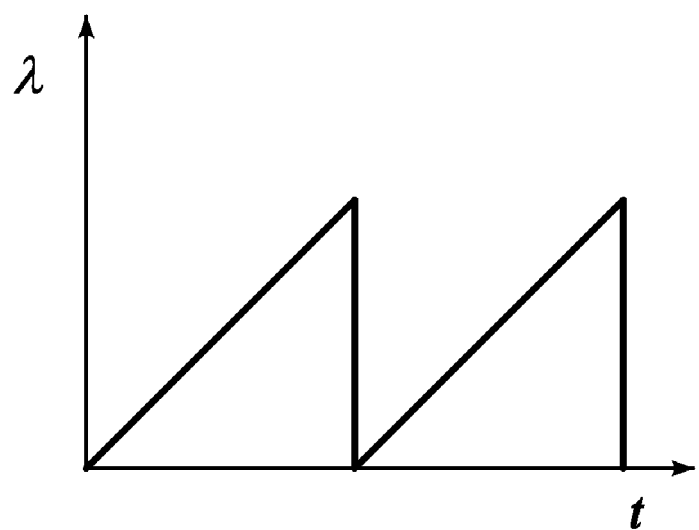
FIG. 3 illustrates a sawtooth wavelength signal that is indicative of the change in wavelength of the light output by the laser diode of the system shown in FIG. 1.

FIG. 3 illustrates a graph of wavelength λ of the light generated by the laser diode 28. In this example, the wavelength λ is ramped in a sawtooth pattern over time as instructed by the processor 26. The wavelength is ramped to cover two free spectral ranges. This guarantees that the produced light signal sensed at the photo diode 32 experiences at least one low loss dip, when in a clean environment.

Figure 4:
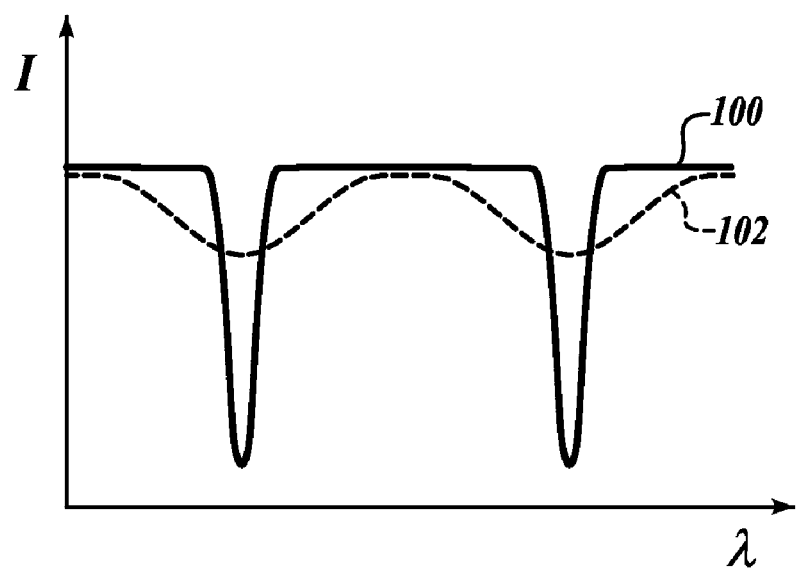
FIG. 4 illustrates a graph that illustrates example responses as detected at a photo diode included in the system shown in FIG. 1.

FIG. 4 illustrates an example graph of light intensity (I) sensed by the photo diode 32 as the wavelength of the light source is swept during a no-radiation period (line 100) and a sensed radiation period (line 102). Dips in light intensity (optical power) occur when an integer number of wavelengths fits into the resonator round-trip optical pathlength. The source wavelength difference between the two dips shown in FIG. 4 is the free spectral range. In the no-radiation period (line 100) the resonance dips are narrow and sharp, indicative of high finesse and low resonator loss. When the resonator loss increased, the dip becomes broader and shallower, line 102. The loss situation indicates a possible presence of the target radiation. The power of the light signal is increased to confirm the loss increase, indicated by the broadened width of the resonance, is due to the target radiation. If the lineshape in line 102 becomes less broad, then sensing of the target radiation is confirmed because annealing is occurring. The presence is further confirmed, if after the power of the light signal is reduced, the lineshape is less broad than that in shape line 102. Note that after the power is reduced, there may be a trend toward lineshape-broadening indicative of continuing radiation exposure, but if the lineshape initially is narrower than that shown in line 102 it indicates that annealing had occurred, and the original roundtrip resonator loss increases in the resonator have been due to radiation exposure.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for measuring target radiation using a sensor having a fiber-optic resonator, the method comprising:
   a) activating the sensor at a first optical power level;
   b) measuring light at a photo sensor;
   c) determining round-trip loss in the fiber-optic resonator based on b);
   d) increasing power to a second optical power level, if the measured light indicates possible presence of the target radiation;
   e) measuring light at the photo sensor after the increase in power;
   f) determining round-trip loss in the fiber-optic resonator based on e);
   g) comparing the results of c) and f); and
   h) outputting an error signal, if the comparison indicates that the target radiation was not detected.

2. The method of claim 1, wherein the first optical power level is between 1 and 1000 µWatts.

3. The method of claim 1, wherein the second optical power level is between 100 and 10000 µWatts.

4. The method of claim 1, wherein h) includes outputting an error signal, if loss of the fiber optic resonator at the second power level is not significantly less than loss of the fiber optic resonator at the first power level.

5. The method of claim 4, wherein a) produces a light signal that has at least one of an increasing or decreasing wavelength over at least one free spectral range of the fiber optic resonator.

6. The method of claim 4, further comprising:
   i) decreasing the power to approximately the first optical power level, if the error signal is not outputted after h);

j) measuring light at the photo sensor after the decrease in optical power;

k) determining round-trip loss in the fiber-optic resonator based on j); and l) confirming that the target radiation was experienced, if the determined resonator loss at k) is within a threshold amount of the loss determined at f).

7. The method of claim 6, further comprising:

m) confirming that the target radiation is still present, if after a threshold period of time, the determined round-trip loss at k) is within a threshold amount of the loss determined at c).

8. The method of claim 1, wherein the second power level is greater than the first power level.

9. A system for measuring target radiation using a fiber-optic sensor, the system comprising:

a light source;

a fiber optic resonator having a fiber-optic coil in optical communication with the light source;

a photo sensor in optical communication with the fiber-optic resonator and configured to produce a measured light signal associated with light received from the fiber-optic resonator; and a processor in signal communication with the light source and the photo sensor, the processor configured to:

instruct the light source to output light at a first power level;

receive a measured light signal from the photo sensor;

determine round-trip loss in the fiber-optic resonator based on the measured light signal at the first power level;

instruct the light source to output light at a second power level, if the determine round-trip loss indicates possible presence of the target radiation;

receive a measured light signal from the photo sensor after the increase in power;

determine round-trip loss in the fiber-optic resonator based on the measured light signal at the second power level;

compare the round-trip losses; and output an error signal, if the comparison indicates that the target radiation was not detected.

10. The system of claim 9, wherein the first power level is between 1 and 1000 μWatts.

11. The system of claim 9, wherein the second power level is between 100 and 10000 μWatts.

12. The system of claim 9, wherein the processor outputs an error signal, if roundtrip loss of the fiber optic resonator at the second power level is not significantly less than roundtrip loss of the fiber optic resonator at the first power level.

13. The system of claim 9, wherein the light source outputs a light signal that has at least one of an increasing or decreasing wavelength over at least one free spectral range of the fiber optic resonator.

14. The system of claim 9, wherein the processor is further configured to:

instruct the light source to decrease the power to approximately the first power level, if the error signal is not outputted;

receive a measured light signal from the photo sensor after the decrease in power;

determine round-trip loss in the fiber-optic resonator based on the measured light signal at the decreased power level; and confirm that the target radiation was experienced, if the determined round-trip loss at the decreased power level is within a threshold amount of the loss determined at the second power level.

15. The system of claim 14, wherein the processor is further configured to:

confirm that the target radiation is still present, if after a threshold period of time, the determined resonator loss at the decreased power level is within a threshold amount of the loss determined at the first power level.

16. The system of claim 9, wherein the second power level is greater than the first power level.

* * * * *